(No Model.)

J. R. BROWN.
OBSTETRICAL FORCEPS.

No. 424,702. Patented Apr. 1, 1890.

WITNESSES:

INVENTOR
J. R. Brown
BY
Munn & Co.
ATTORNEY

UNITED STATES PATENT OFFICE.

JAMES R. BROWN, OF SPRINGFIELD, MASSACHUSETTS.

OBSTETRICAL FORCEPS.

SPECIFICATION forming part of Letters Patent No. 424,702, dated April 1, 1890.

Application filed May 28, 1889. Serial No. 312,411. (No model.)

*To all whom it may concern:*

Be it known that I, JAMES R. BROWN, of Springfield, in the county of Hampden and State of Massachusetts, have invented new and Improved Obstetrical Forceps, of which the following is a full, clear, and exact description.

The object of this invention is to provide an implement whereby an artificial delivery of a human fetus may be readily brought about; and to the end named the invention consists in the construction and arrangement of parts, as will be hereinafter fully described and claimed.

Reference is to be had to the accompanying drawings, forming a part of this specification, in which similar figures of reference indicate corresponding parts in all the views.

Figure 1:
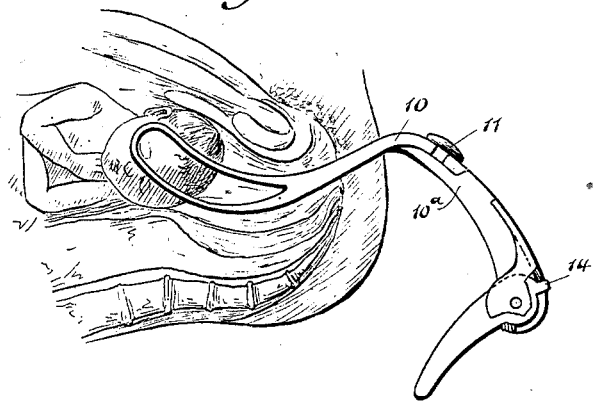
Figure 2:
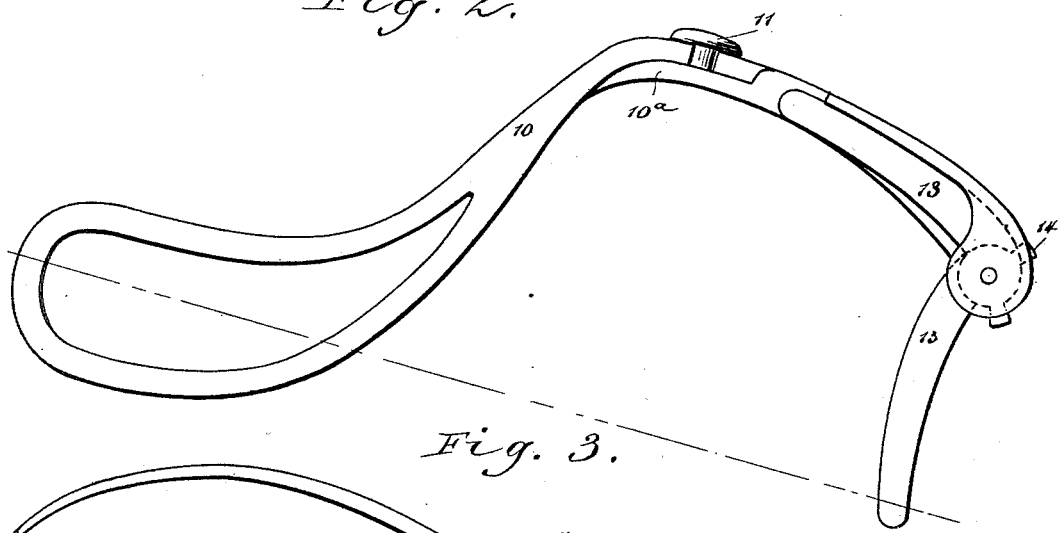
Figure 3:
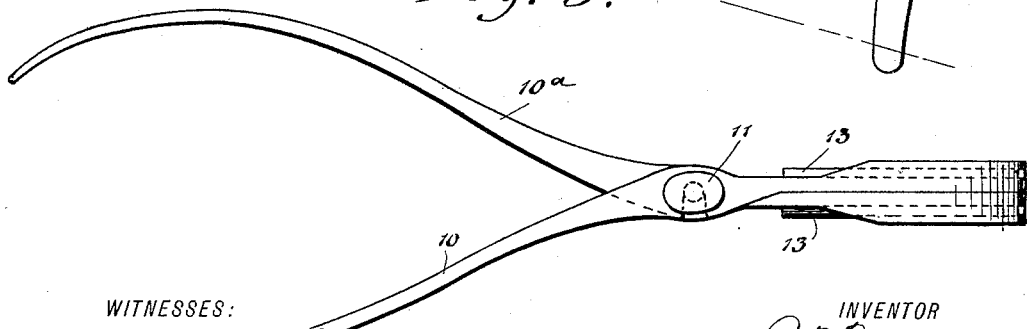

Figure 1 is a side view of my improved obstetrical implement, the same being represented as it appears when in use, parts being broken away. Fig. 2 is an enlarged side view of the implement, and Fig. 3 is a top or plan view of the same.

Referring to the specific construction illustrated in the drawings above referred to, 10 and 10ª are the forcep blades or members, of which members one is provided with a headed stud or pin 11 and the other with a recess adapted to receive the shank of the stud or pin. The blades or members 10 and 10ª extend downward and outward from the point of their pivotal connection, the bearing-points of the blades being of the ordinary form, as shown. To the rear of the pivot pin or stud the handles of both members extend downward, as shown, and to the rear or outer end of each handle there is pivotally connected a hand-piece 13, said hand-pieces being provided with lugs or projections 14, which ride in grooves formed in the handles.

The lugs or projections 14 act as stops and prevent any movement of the hand-pieces beyond the position in which the lowered hand-piece is shown in Fig. 2.

In operation the forceps are applied in the usual manner, being adjusted as represented in Fig. 1. The hand-pieces 13 are then turned down and afford a secure grip for the operator in a position such that the pull is exerted in a direct line. In order that the pull may be in a straight line, the hand-pieces must extend down to or below a line drawn longitudinally through blade-like ends of the members, as shown in dotted lines, Fig. 2.

Having thus described my invention, I claim as new and desire to secure by Letters Patent—

1. An obstetrical forceps consisting in the two members pivotally connected between their ends at 11, and bent downwardly and forwardly in front of said pivotal point, the rear ends of the members having hand-pieces extending downwardly to the longitudinal plane of the blade, substantially as set forth.

2. In a pair of forceps, the combination, with the blades or members, of hand-pieces pivotally connected to the ends of the handles, substantially as described.

3. In a pair of forceps, the combination, with the blades or members, bent as described, of hand-pieces pivotally connected to the member-handles, and stops or projections formed upon the hand-pieces, said projections riding in grooves formed in the handles, substantially as described.

JAMES R. BROWN.

Witnesses:
GEO. F. FULLER,
CHAS. E. FOY.